United States Patent
Hueffer et al.

(10) Patent No.: US 10,836,208 B2
(45) Date of Patent: Nov. 17, 2020

(54) RUBBER COMPOSITION, ITS MANUFACTURE AND USE

(71) Applicant: BASF SE, Ludwigshafen am Rhein (DE)

(72) Inventors: Stephan Hueffer, Ludwigshafen (DE); Fritz Nimtz, Ludwigshafen (DE); Achim Fessenbecker, Ludwigshafen (DE); Alejandra Garcia Marcos, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/310,894

(22) PCT Filed: Jun. 19, 2017

(86) PCT No.: PCT/EP2017/064918
§ 371 (c)(1),
(2) Date: Dec. 18, 2018

(87) PCT Pub. No.: WO2018/001772
PCT Pub. Date: Jan. 4, 2018

(65) Prior Publication Data
US 2019/0143751 A1    May 16, 2019

(30) Foreign Application Priority Data
Jun. 28, 2016   (EP) .................... 16176688

(51) Int. Cl.
| C08K 5/06 | (2006.01) |
| B60C 1/00 | (2006.01) |
| C08K 3/36 | (2006.01) |
| C08K 5/20 | (2006.01) |
| C08L 9/06 | (2006.01) |

(52) U.S. Cl.
CPC ............. *B60C 1/0016* (2013.01); *C08K 3/36* (2013.01); *C08K 5/06* (2013.01); *C08K 5/20* (2013.01); *C08L 9/06* (2013.01)

(58) Field of Classification Search
USPC .................. 523/157; 524/492, 494, 495, 496
See application file for complete search history.

(56) References Cited

U.S. PATENT DOCUMENTS

| 3,867,326 A | 2/1975 | Rivin et al. |
| 5,717,022 A | 2/1998 | Beckmann et al. |

FOREIGN PATENT DOCUMENTS

| DE | 102004005132 A1 | 8/2005 |
| EP | 0761734 A1 | 3/1997 |
| EP | 2883901 A1 | 6/2015 |
| EP | 2995644 A1 | 3/2016 |
| EP | 3012290 A1 | 4/2016 |
| WO | WO-2005/056664 A1 | 6/2005 |

OTHER PUBLICATIONS

European Search Report for EP Patent Application No. 16176688.6, dated Oct. 27, 2016.
International Search Report for PCT Patent Application No. PCT/EP2017/064918, dated Oct. 12, 2017.

*Primary Examiner* — Terressa Boykin
(74) *Attorney, Agent, or Firm* — Marshall, Gerstein & Borun LLP

(57) ABSTRACT

A rubber composition containing
(A) at least one rubber selected from sulphur vulcanizable rubbery elastomers,
(B) silica,
(C) at least one non-ionic surfactant (C) that is selected from compounds according to general formula (I a)

$$R^1-CH(OH)-CH_2-O-(AO)_x-R^2, \quad (I\ a)$$

and from compounds according to general formula (I b)

$$R^1-CH(OH)-CH_2-O-(AO)_x-A^1-O-(AO)_y-CH_2-CH(OH)-R^1, \quad (I\ b)$$

and from compounds according to general formula (I c)

$$R^1-CO-NH-CH_2-CH_2-O-(AO)_x-CH_2-CH_2-NH-CO-R^1, \quad (I\ c)$$

wherein
$R^1$ are same or different and selected from $C_4$-$C_{30}$-alkyl, straight-chain or branched, and from $C_4$-$C_{30}$-alkylene, straight-chain or branched, with at least one C—C double bond,
$R^2$ are same or different and selected from $C_1$-$C_{30}$-alkyl, straight-chain or branched, and from $C_2$-$C_{30}$-alkylene, straight-chain or branched, with at least one C—C double bond,
$R^2$ is selected from $C_2$-$C_{10}$-alkylene, straight chain or branched,
x, y same or different and selected from 10 to 50, and
AO is selected from identical or different alkylene oxides, selected from $CH_2$—$CH_2$—O, $(CH_2)_3$—O, $(CH_2)_4$—O, $CH_2CH(CH_3)$—O, $CH(CH_3)$—$CH_2$—O— and $CH_2CH(n\text{-}C_3H_7)$—O, is disclosed.

10 Claims, No Drawings

RUBBER COMPOSITION, ITS MANUFACTURE AND USE

CROSS-REFERENCE TO RELATED APPLICATIONS

This is a U.S. national phase of International Application No. PCT/EP2017/064918, filed Jun. 19, 2017, which claims the benefit of European Patent Application No. 16176688.6, filed Jun. 28, 2016.

The present invention is directed towards a rubber composition comprising
(A) at least one rubber selected from sulphur vulcanizable rubbery elastomers,
(B) silica,
(C) at least one non-ionic surfactant (C) that is selected from compounds according to general formula (I a)

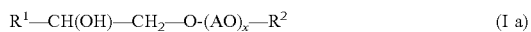  (I a)

and from compounds according to general formula (I b)

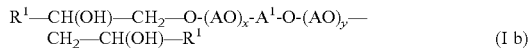  (I b)

and from compounds according to general formula (I c)

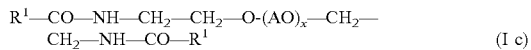  (I c)

wherein
$R^1$ are same or different and selected from $C_4$-$C_{30}$-alkyl, straight-chain or branched, and from $C_4$-$C_{30}$-alkylene, straight-chain or branched, with at least one C—C double bond,
$R^2$ are same or different and selected from $C_1$-$C_{30}$-alkyl, straight-chain or branched, and from $C_2$-$C_{30}$-alkylene, straight-chain or branched, with at least one C—C double bond,
$A^1$ is selected from $C_2$-$C_{10}$-alkylene, straight chain or branched,
x, y same or different and selected from 10 to 50,
AO is selected from identical or different alkylene oxides, selected from $CH_2$—$CH_2$—O, $(CH_2)_3$—O, $(CH_2)_4$—O, $CH_2CH(CH_3)$—O, $CH(CH_3)$—$CH_2$—O— and $CH_2CH(n-C_3H_7)$—O.

Silica enforced rubbers are of high interest for the tire industry. In many tire applications it is desired to replace at least some of the carbon black by silica. Such silica-enforced tires have been labelled as environmentally friendly replacements of purely carbon black-enforced tires. In addition, in some applications it is desired to provide colored tires. A pure carbon black enforcement, however, generally leads to black tires. In addition, in particular silica-enforcement leads to an improved performance compared to pure carbon enforcement and to pure silica enforcement.

From the view of safety and driving performance, the tread plays a key role in a tire because the tread has direct to the ground, and compared to other parts of the tire the tread is subject to abrasion to the greatest extent.

Silica-enforced rubbers are known in the art, see, e.g., U.S. Pat. No. 3,867,326, DE 10 2004 005 132, and WO 2005/056664. A key step is the vulcanizing step during which the one or more enforcing agents and further additives are preferably introduced into the rubber. At the same time, vulcanization takes place. Uneven distribution of enforcing agents and further additives during the vulcanization step may lead to unfavorable properties of the tire but cannot be healed. A key processing step is therefore the mixing step. In order to improve mixing various ways have been suggested, depending for example on suitable mixing equipment, mixing conditions and processing aids. Any processing aid needs to fulfil several conditions. It has to successfully improve the mixing itself, and has to be either readily removable or in the alternative may be left in the tire without negatively affecting the tire.

Vicinal diols are known as mixing auxiliaries, see EP 0 761 734, for example sorbitan mono- or diesters, and triols such as 1,1,1-trimethylolpropane. However, sometimes an unfavorable aging behavior of the tire is assigned to the use of diols.

Nowadays there is an increasing demand for tires with improved driving characteristics with the lowest possible rolling resistance, which is substantially of the tread rubber compound, is determined by the tire pressure of the tire width and the tread pattern.

It was therefore an objective of the present invention to provide rubber compositions that allow the manufacture of environmentally friendly tire parts, especially treads, and that are easily to be processed and vulcanized. It was an additional objective of the present invention to provide a process for making tire parts. It was furthermore an objective to provide tires with excellent drive characteristics, for example roll characteristics.

Accordingly, the rubber compositions defined at the outset have been found, hereinafter also referred to as inventive rubber compositions. The term "rubber composition" as used herein refers to a composition before vulcanization. It may also be referred to as rubber stock or rubber stock composition.

Inventive rubber compositions comprise
(A) at least one rubber selected from sulphur vulcanizable rubbery elastomers, hereinafter also referred to as uncured rubber (A).

Such rubber may chemically be a single rubber or a mixture of at least two chemically different uncured rubbers (A). Vulcanizable rubbers in the context of the present invention are uncured rubbers. Uncured rubbers contain C—C double bonds. Such C—C double bonds may be vinyl groups, —CH=$CH_2$, or —C—$(CH_3)$=$CH_2$) groups or internal double bonds such as —CH=$C(CH_3)$— groups. Both vinyl groups and C—C-double bonds allow for crosslinking the polymer chains of the uncured rubber with sulphur.

Examples of polymers that may serve as uncured rubbers (A) are polybutadiene, polychloroprene, also called neoprene, acrylonitrile butadiene rubber ("NBR"), ethylene propylene dene monomer rubber ("EPDM"), natural rubber, poly-2,3-dimethyl butadiene, styrene butadiene rubber ("SBR"), butyl rubber, carboxylated nitrile rubber ("XNBR"), hydrogenated carboxylated nitrile rubber ("HX-NBR"), and mixtures of at least two of the foregoing. Preferred uncured rubber (A) is SBR. Preferred binary mixtures are co-vulcanizates of SBR and neoprene and of SBR and natural rubber, and of SBR and butyl rubber. SBR may be made in solution ("S-SBR") or in emulsion ("E-SBR").

Inventive rubber compositions additionally comprise
(B) silica.

Silica (B) may be selected from precipitated silica and fumed silica. Preferably, silica (B) is selected from treated silica (B) in order to reduce hygroscopicity and deactivation of the curing agent. For example, silica (B) may be selected from so-called hydrophobically modified silica such as silica treated with an organosilane, for example with hexamethyldisilazane, 1,1,3,3-tetramethyldisilazane, 1,3-divinyl-1,1,3,3-tetramethyldisilazane, 1,3-diphenyl-1,1,3,3-tetramethyldisilazane and especially with at least bi-functional silanes, for example with silanes of general formulae $(R^3O)_3Si$—$(CH_2)_n$—SY and $(C_2H_5O)_3Si$—$(CH_2)_3$—$S_m$—$(CH_2)$—$Si(OR^3)_3$ with $R^3$ being same or different and selected from $C_1$-$C_4$-alkyl, for example methyl, ethyl, n-propyl, isopropyl, n-butyl, iso-butyl, and sec.-butyl, preferred is ethyl, and n being selected from 2 to 5, preferably 3, and m being selected from 1 to 10, and Y being selected from H and cyanide. Particularly preferred is $(C_2H_5O)_3Si$—$(CH_2)_3$—Si—$(C_2H_5O)_3Si$—$(CH_2)_3$—SCN and $(C_2H_5O)_3Si$—$(CH_2)_3$—$S_4$—$(CH_2)_3$—$Si(OC_2H_5)_3$.

In other embodiments, silica (B) is selected from heat-treated silica, for example silica treated at 400 to 1,000° C.

Silica (B) preferably has spherical particle shape. Spherical particle shape may be achieved by spray-drying in the case of precipitated silica (B), or it is the preferred outcome in the case of fumed silica.

In one embodiment of the present invention, the average particle diameter (number average) of silica (B) is in the range of from 2 to 200 μm, preferably 10 to 80 μm, determined by electron microscopy. In embodiments wherein silica (B) is in the form of agglomerates, the average particle diameter (number average) refers to the average diameter (number average) of the agglomerates and may be termed as average secondary particle diameter (number average). Primary particles that make up to agglomerates may have an average particle diameter in the range of from 5 to 50 nm.

In one embodiment of the present invention, the BET surface of silica (B) is in the range of from 50 to 450 m²/g, determined by $N_2$ adsorption according to DIN ISO 9277: 2003-05, preferably from 50 to 200 m²/g.

Preferred examples of silica (B) are silicas with an average secondary particle diameter (number average) in the range of from 10 to 0 μm, silanized with $(C_2H_5O)_3Si$—$(CH_2)_3$—SCN or with $(C_2H_5O)_3Si$—$(CH_2)_3$—$S_4$—$(CH_2)_3Si(OC_2H_5)_3$.

In one embodiment of the present invention, inventive rubber compositions comprise in the range of from 10 to 100 phr silica (B), preferably up to 85 phr. The abbreviation phr means "parts per hundred rubber" and refers to parts by weight.

It is possible to silanize silica (B) in situ or to start off from mixing silanized Inventive rubber compositions additionally comprise (C) at least one non-ionic surfactant (C), hereinafter also referred to as surfactant (C), said surfactant (C) being selected from compounds according to general formula (I a)

$R^1$—CH(OH)—$CH_2$—O-$(AO)_x$—$R^2$  (I a)

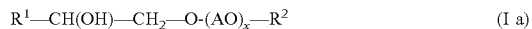

and from compounds according to general formula (I b)

$R^1$—CH(OH)—$CH_2$—O-$(AO)_x$-$A^1$-O-$(AO)_y$—$CH_2$—CH(OH)—$R^1$  (I b)

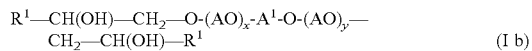

and from compounds according to general formula (I c)

$R^1$—CO—NH—$CH_2$—$CH_2$—O-$(AO)_x$—$CH_2$—$CH_2$—NH—CO—$R^1$  (I c)

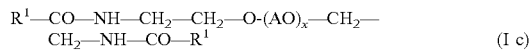

wherein $R^1$ are same or if applicable different and selected from $C_4$-$C_{30}$-alkyl, straight-chain or branched, and from $C_4$-$C_{30}$-alkylene, straight-chain or branched, with at least one C—C double bond, preferred is $C_4$-$C_{30}$-alkyl, straight-chain or branched, more preferred is straight-chain $C_4$-$C_{30}$-alkyl and even more preferred is n-$C_6$-$C_{16}$-alkyl, for example n-hexyl, n-heptyl, n-octyl, n-nonyl, n-decyl, n-undecyl, n-dodecyl, n-tridecyl, n-tetradecyl, and n-hexadecyl. In compounds according to general formula (I b) it is preferred that both $R^1$ are the same.

x, y same or—applicable—different and selected from 6 to 50, preferably 12 to 25. In compounds according to general formula (I b), it is preferred that x and y take the same value.

AO is selected from identical or different alkylene oxides selected from $CH_2$—$CH_2$—O, —$(CH_2)_3$—O, —$(CH_2)_4$—O, —$CH_2CH(CH_3)$—O, —$CH(CH_3)$—$CH_2$—O— and $CH_2CH(n$-$C_3H_7)$—O. Preferred example of AO is $CH_2$—$CH_2$—O ("EO").

In the context of the present invention, the expressions EO and EO groups may be used interchangeably.

In one embodiment of the present invention, $(AO)_x$ is selected from $(EO)_{x1}$, x1 being selected from one to 50.

In one embodiment of the present invention, $(AO)_x$ is selected from -$(EO)_{x2}$—$(CH_2CH(CH_3)$—O$)_{x3}$ and -$(EO)_{x2}$—$(CH(CH_3)CH_2$—O$)_{x3}$, x2 and x3 being identical or different and selected from 1 to 30.

In one embodiment of the present invention, $(AO)_x$ is selected from $(EO)_{x4}$, x4=being in the range of from 10 to 50, AO being EO, and $R^1$ and $R^2$ each being independently selected from $C_8$-$C_{14}$-alkyl.

In the context of the present invention, x or x1 or x2 and x3 or x4 are to be understood as average values, the number average being preferred. Therefore, each x or x1 or x2 or x3 or x4 if applicable can refer to a fraction although a specific molecule can only carry a whole number of alkylene oxide units.

In compounds according to general formula (I b), the same applies to $(AO)_y$ mutatis mutandis.

In compounds according to general formula (I a), $R^2$ is selected from selected from $C_1$-$C_{30}$-alkyl, straight-chain or branched, and from $C_2$-$C_{30}$-alkylene, straight-chain or branched, with at least one C—C double bond, preferred is $C_6$-$C_{18}$-alkyl, for example n-hexyl, iso-hexyl, n-heptyl, iso-heptyl, n-octyl, iso-octyl, n-nonyl, iso-nonyl, n-decyl, iso-decyl, 2-n-propylheptyl, n-undecyl, iso-undecyl, n-dodecyl, isododecyl, n-tetradecyl, n-hexadecyl, n-octadecyl, and combinations of isomers of any of the forgoing, more preferred is $C_8$-$C_{14}$-alkyl.

In compounds according to general formulae (I b), $A^1$ is selected from $C_2$-$C_{10}$-alkylene, straight chain or branched, for example —$CH_2$—$CH_2$—, —$CH_2$—CH$(CH_3)$—, —$CH_2$—CH$(CH_2CH_3)$—, —$CH_2$—CH(n-$C_3H_7)$—, —$CH_2$—CH(n-$C_4H_9)$—, —$CH_2$—CH(n-$C_5H_{11})$—, —$CH_2$—CH(n-$C_6H_{13})$—, —$CH_2$—CH(n-$C_8H_{17})$—, —CH$(CH_3)$—CH$(CH_3)$—, —$(CH_2)_3$—, —$(CH_2)_4$—, —$(CH_2)_5$—, —$(CH_2)_6$—, —$(CH_2)_8$—, —$(CH_2)_{10}$—, —C$(CH_3)_2$—, —$CH_2$—C$(CH_3)_2$—$CH_2$—, and —$CH_2$—[C$(CH_3)_2]_2$—$CH_2$—.

Preferred residues $A^1$ are —$CH_2$—$CH_2$—, $CH_2$—CH$(CH_3)$—, —$CH_2$—CH$(CH_2CH_3)$—, —$CH_2$—CH(n-$C_3H_7)$—, —$CH_2$—CH(n-$C_4H_9)$—, —$CH_2$—CH(n-$C_6H_{13})$—, and —$(CH_2)_4$—.

Among compounds according to general formula (I a) and compounds according to general formula (I b), compounds according to general formula (I a) are preferred.

In a preferred embodiment of the present invention, compound according to general formula (I a) has at least one branching per molecule.

In one class of examples of said preferred embodiment, $R^2$ in compounds according to general formula (I a) is selected from branched $C_6$-$C_{18}$-alkyl and all AO are EO. Such branched $C_6$-$C_{18}$-alkyl may have one or more branches, for example iso-hexyl, iso-heptyl, 2-ethylhexyl ("2-EH"), isooctyl, isodecyl, 2-n-propylheptyl ("2-PH"), 2-isopropyl-5-methylhexyl, isotridecyl, especially tetramethylnonyl.

In another preferred embodiment of the present invention, $R^2$ in compound according to general formula (I a) is selected from linear $C_6$-$C_{18}$-alkyl and an average of at least 0.5 AO per molecule is a propylene oxide group, with the other AO groups preferably being EO groups. For example, in such a compound an average of 0.5 to 1 AO groups per molecule is a propylene oxide group and the other AO groups are EO groups.

Examples of particularly suitable surfactants (C) according to general formula (I a) are n-$C_8H_{17}$—CH(OH)—$CH_2$-(EO)$_{40}$-iso-$C_{11}H_{23}$
n-$C_8H_{17}$—CH(OH)—$CH_2$-(EO)$_{40}$-iso-$C_{13}H_{27}$
n-$C_8H_{17}$—CH(OH)—$CH_2$-(EO)$_{22}$—CH($CH_3$)—$CH_2$—O-n-$C_{10}H_{21}$
n-$C_{10}H_{21}$—CH(OH)—$CH_2$-(EO)$_{22}$—CH($CH_3$)—$CH_2$—O-n-$C_{10}H_{21}$
n-$C_{10}H_{21}$—CH(OH)—$CH_2$-(EO)$_{22}$—CH($CH_3$)—$CH_2$—O-n-$C_8H_{17}$
n-$C_8H_{17}$—CH(OH)—$CH_2$-(EO)$_{22}$—CH($CH_3$)—$CH_2$—O-n-$C_8H_{17}$
n-$C_8H_{17}$—CH(OH)—$CH_2$-(EO)$_{40}$—CH($CH_3$)—$CH_2$—O-n-$C_{10}H_{21}$
n-$C_{10}H_{21}$—CH(OH)—$CH_2$-(EO)$_{40}$—CH($CH_3$)—$CH_2$—O-n-$C_{10}H_{21}$
n-$C_{10}H_{21}$—CH(OH)—$CH_2$-(EO)$_{40}$—CH($CH_3$)—$CH_2$—O-n-$C_8H_{17}$
n-$C_8H_{17}$—CH(OH)—$CH_2$-(EO)$_{40}$—CH($CH_3$)—$CH_2$—O-n-$C_8H_{17}$
n-$C_{10}H_{21}$—CH(OH)—$CH_2$—O-(EO)$_{22}$-iso-$C_{11}H_{23}$
n-$C_8H_{17}$—CH(OH)—$CH_2$—O-(EO)$_{22}$-iso-$C_{11}H_{23}$
n-$C_{10}H_{21}$—CH(OH)—$CH_2$—O-(EO)$_{19.5}$-iso-$C_{11}H_{23}$
n-$C_8H_{17}$—CH(OH)—$CH_2$—O-(EO)$_{19.5}$-iso-$C_{11}H_{23}$
n-$C_{10}H_{21}$—CH(OH)—$CH_2$—O-(EO)$_{22}$-n-$C_{16}H_{33}$
n-$C_{10}H_{12}$—CH(OH)—$CH_2$—O-(EO)$_{22}$-iso-$C_{13}H_{27}$ Examples of particularly suitable surfactants (C) according to general formula (I b) are

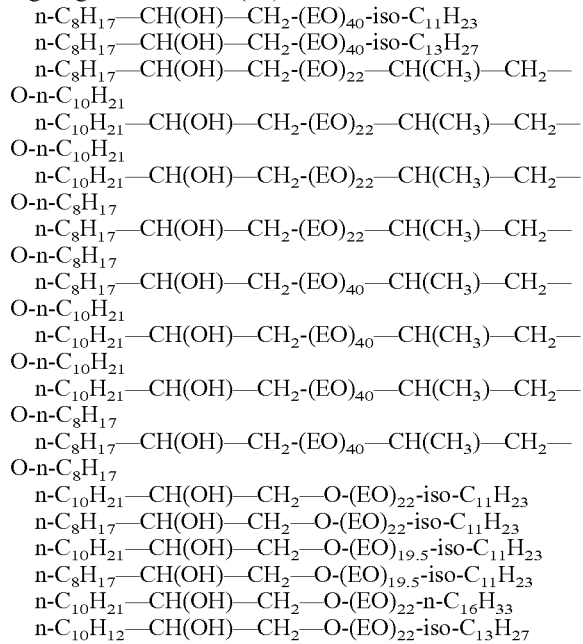

with both $R^1$ in formula (I b.1) and (I b.2) and (b.3) being the equal and selected from n-$C_8H_{17}$ and n-$C_{10}H_{21}$.

In one embodiment of the present invention inventive concentrate contains two different compounds according to general formula (I a) or two different compounds according to general formula (I b).

In one embodiment of the present invention, inventive rubber compositions contain 0.5 to 5 phr non-ionic surfactant (C), preferably 1 to 4 phr.

In one embodiment of the present invention, inventive rubber compositions may additionally comprise
(D) at least one polymer selected from polyalkylenimines, polyalkoxylated or not polyalkoxylated, hereinafter also referred to as polyalkylenimine (D) or alkoxylated polyalkylenimine (D), as the case may be.

Polyalkylenimine (D) as used herein refers to polymers of one or more polyalkylenimines that are usually made by ring-opening polymerization of the respective alkylenimine or by polycondensation reactions of alkylene diamines or of hydroxyalkylamines such as, but not limited to ethanolamine.

Polyalkylenimine (D) may bear substituents at primary or secondary N-atoms of the backbone polyalkylenimine. In other embodiments, polyalkylenimines (D) are non-substituted. Suitable substituents are polyalkylenoxide chains such as, but not limited to polyethylenoxide chains and polypropylene-oxide chains and mixed polyalkylenoxide chains. Further examples of substituents are $CH_2COOH$ groups, as free acids or partially or fully neutralized with alkali. Polyalkylenimines bearing one or more of the foregoing substituents are hereinafter also referred to as substituted polyalkylenimines (D).

Preferred examples of polyalkylenimines (D) are polyethylenimine and polypropylenimine, hereinafter also referred to as polyethylenimine (D) and polypropylenimine (D), respectively. Preferred examples of substituted polyaylkylenimines (B) are substituted polyethylenimine and substituted polypropylenimine, hereinafter also referred to as substituted polyethylenimine (D) and as substituted polypropylenimine (D), respectively. In embodiments wherein polyaylkylenimines (B) are referred to that are neither polyalkoxylated nor substituted with $CH_2COOH$ groups such polyaylkylenimines (B) may also be referred to as non-substituted polyaylkylenimines (B).

In one embodiment of the present invention, the average molecular weights $M_w$ of polyalkylenimine (D) and especially of polyethylenimine (D) that are non-substituted are in the range of from 400 to 50,000 g/mol, preferably 500 to 25,000 g/mol and more preferably from 750 up to 15,000 g/mol. The average molecular weight $M_w$ of non-substituted polyalkylenimines (D) may be determined by gel permeation chromatography (GPC), with 1.5% by weight aqueous formic acid as eluent and cross-linked poly-hydroxyethylmethacrylate as stationary phase.

In one embodiment of the present invention, the average molecular weight $M_w$ of substituted polyalkylenimine (D) is in the range of from 800 to 500,000 g/mol, preferably up to 100,000 g/mol. The average molecular weight $M_w$ of substituted polyalkylenimines (D) may be determined by gel permeation chromatography (GPC), with 1.5% by weight aqueous formic acid as eluent and cross-linked poly-hydroxyethylmethacrylate as stationary phase. In case of $CH_2COOH$-substituents, the molecular weight refers to the respective free acid.

Polyalkylenimines (D) including non-substituted polyethylenimines (D) and substituted polyalkylenimines (D) may display a polydispersity $Q=M_w/M_n$ in the range of from 1.1 to 20, preferably in the range of from 1.5 to 10 and more preferably up to 5.5.

In one embodiment of the present invention, substituted polyethylenimine (D) is selected from those with alkylene oxide units and N atoms in a molar ratio in the range of from 1:1 to 100:1, preferably in the range of from 2:1 to 50:1, the N atoms stemming from alkylenimine units. Preferably, the alkylenimine units are ethylenimine units in their majority, for example at least 60 mol-%, referring to the total of alkylenimine units, preferably at least 70 mol-%.

In a special embodiment of the present invention, inventive alkoxylated polyethylenimine (D) is selected from those with alkylene oxide units and N atoms in a molar ratio in the range of from 1:1 to 100:1, preferably in the range of 2:1 to 50:1, the N atoms resulting from ethylenimine units, and no alkylenimine units other than ethylenimine units being present.

In one embodiment of the present invention, substituted polyethylenimine (D) is selected from those with 40 to 85% of all N atoms being substituted with $CH_2COOH$ groups, the N atoms stemming from NH— and $NH_2$-units and the $CH_2COOH$ groups being free acid or partially or fully neutralized with alkali.

Alkoxylated polyalkylenimines (D) can be conveniently made by alkoxylation of non-substituted polyalkylenimines (D). Non-substituted polyalkylenimines (D) will be described in more detail below.

Preferred non-substituted polyalkylenimines (D) are selected from non-substituted polypropylenimines (D) and even more preferred are non-substituted polyethylenimines (D).

The term "polyethylenimines" in the context of the present invention does not only refer to polyethylenimine homopolymers but also to polyalkylenimines containing NH—$CH_2$—$CH_2$—NH structural elements together with other alkylene diamine structural elements, for example NH—$CH_2$—$CH_2$—$CH_2$—NH structural elements, NH—$CH_2$—$CH(CH_3)$—NH structural elements, NH—$(CH_2)_4$—NH structural elements, NH—$(CH_2)_6$—NH structural elements or $(NH—(CH_2)_8$—NH structural elements but the NH—$CH_2$—$CH_2$—NH structural elements being in the majority with respect to the molar share. Preferred polyethylenimines contain NH—$CH_2$—$CH_2$—NH structural elements being in the majority with respect to the molar share, for example amounting to 60 mol-% or more, more preferably amounting to at least 70 mol-%, referring to all alkylenimine structural elements. In a special embodiment, the term polyethylenimine refers to those polyalkylenimines that bear only one or zero alkylenimine structural element per molecule that is different from NH—$CH_2$—$CH_2$—NH.

Branches may be alkylenamino groups such as, but not limited to —$CH_2$—$CH_2$—$NH_2$ groups or $(CH_2)_3$—$NH_2$-groups. Longer branches may be, for examples, —$(CH_2)_3$—$N(CH_2CH_2CH_2NH_2)_2$ or —$(CH_2)_2$—$N(CH_2CH_2NH_2)_2$ groups. Highly branched polyethylenimines are, e.g., polyethylenimine dendrimers or related molecules with a degree of branching in the range from 0.25 to 0.95, preferably in the range from 0.30 to 0.80 and particularly preferably at least 0.5. The degree of branching can be determined for example by $^{13}$C-NMR or $^{15}$N-NMR spectroscopy, preferably in $D_2O$, and is defined as follows:

$$DB=D+T/D+T+L$$

with D (dendritic) corresponding to the fraction of tertiary amino groups, L (linear) corresponding to the fraction of secondary amino groups and T (terminal) corresponding to the fraction of primary amino groups.

Within the context of the present invention, preferred non-substituted polyethylenimines (D) are non-substituted polyethylenimines (D) with DB in the range from 0.25 to 0.95, particularly preferably in the range from 0.30 to 0.90% and very particularly preferably at least 0.5.

In the context of the present invention, $CH_3$-groups are not being considered branches in polyalkylenimines (D).

In one embodiment of the present invention, surfactant (C) is selected from compounds according to general formula (I a) or (I b) and polyalkylenimine (D) is selected from non-substituted polyethylenimines with an average molecular weight $M_w$ in the range of from 400 to 25,000 g/mol.

In embodiment wherein polyalkylenimine (D) is present, inventive rubber compositions preferably contain in the range of from 0.01 to 1 phr polyalkylenimine (D), preferred are 0.05 to 0.5 phr.

Inventive rubber mixtures may contain one or more further ingredients (F). Such further ingredient(s) may serve various purposes, for example mineral fillers curing accelerators, cure retarders, processing aids like tar, oil, or fatty acids or their salts, pigments such as carbon black, antioxidants, and reinforcing agents, for example glass fibres. Further examples of further ingredients (F) are stabilizers, for example heat stabilizers, ozone stabilizers, light stabilizers, especially UV stabilizers.

Carbon black may be present in quantities of from 10 to 40 phr.

Examples of oils are paraffinic oils, aromatic type oils, and naphthenic oils. Preferred are treated distillate aromatic extracts, also known as TDAE. Even more preferred are paraffinic oils.

Examples of fatty acids are $C_{11}$-$C_{31}$-alkyl carboxylic acids and $C_{11}$-$C_{31}$-alkenyl carboxylic acids, for example with one, two or three C—C double bond(s) per molecule. Specific examples are oleic acid, stearic acid and palmitic acid and their respective salts. In one embodiment, inventive rubber compositions contain in the range of from 0.1 to 20% by weight fatty acid(s) or their salts. Suitable counterions are $Zn^{2+}$, $NH_4^+$, $Ca^{2+}$ and $Mg^{2+}$.

Preferred examples of mineral fillers are like zinc oxide, silicates such as synthetic silicates and natural silicates such as kaolin, further more calcium carbonate, magnesium oxides, magnesium carbonate, zinc carbonate, or clay, titanium dioxide, talc, gypsum, alumina, preferred are bentonite, kaolin, zinc oxide.

Examples of cure retarders are benzoic acid, phthalic anhydride, and salicylic acid.

Further examples of ingredient(s) (F) are amines, especially ethanolamines, for example ethanolamine, N,N-diethanolamine, N-methylethanolamine, and N,N-dimethylethanolamine.

In one embodiment of the present invention, inventive rubber compositions have a Mooney viscosity in the range of from 30 to 50 Mooney units, determined at 100° C. according to DIN 53523-2: 1991-05.

A further aspect of the present invention is the use of inventive rubber compositions for the manufacture of tire parts, especially for the manufacture of treads. A further aspect is thus a process for the manufacture of tire parts ad especially of treads by using an inventive rubber composition, hereinafter also referred to as inventive tire manufacturing process. By the inventive manufacturing process, tire parts and especially silica-containing treads may be made readily, without too tedious a mixing process. Without wishing to be bound by any theory, we assume that due to the comparably low viscosity of the inventive rubber composition mixing may be achieved much easier.

In order to initiate the curing, sulphur is added to the inventive rubber composition. One or more sulphur compounds such as zinc diethyldithiocarbamate, zinc ethyl phenyl dithiocarbamate, dimethyldiphenyl thiuramdisulfide, zinc dibutyldithiocarbamate, dibenzodiazyldisulfide, zinc dibenzyl dithiocarbamate, tetramethylthiuram disulfide $(CH_3)_2N—C(=S)—S—S—C(=S)—N(CH_3)_2$, or 1,3-benzothiazol-2-thiol, may be added as well. Further examples of suitable vulcanization accelerators are xanthogenates, toluidines and anilines. Vulcanization accelerators may be applied as such or together with an activator such as ZnS or $Sb_2S_3$ or PbO.

A further aspect of the present invention is thus a process for making a tire tread comprising the step of mixing silica (B) with non-ionic surfactant (C) that is selected from compounds according to general formula (I a)

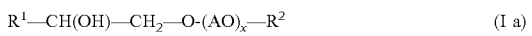

and from compounds according to general formula (I b)

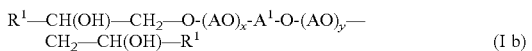

and from compounds according to general formula (I c)

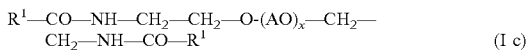

wherein
$R^1$ are same or different and selected from $C_3$-$C_{30}$-alkyl, straight-chain or branched, and from $C_4$-$C_{30}$-alkylene, straight-chain or branched, with at least one C—C double bond,
$R^2$ are same or different and selected from $C_1$-$C_{30}$-alkyl, straight-chain or branched, and from $C_2$-$C_{30}$-alkylene, straight-chain or branched, with at least one C—C double bond,
$A^1$ is selected from $C_2$-$C_{10}$-alkylene, straight chain or branched,
x, y same or different and selected from 10 to 50,
AO is selected from identical or different alkylene oxides, selected from $CH_2—CH_2—O$, $(CH_2)_3—O$, $(CH_2)_4—O$, $CH_2CH(CH_3)—O$, $CH(CH_3)—CH_2—O—$ and $CH_2CH(n-C_3H_7)—O$,
and sulphur or at least one sulphur compound (E) and, optionally, one or more further ingredients (F) in a kneader, mill, extruder or internal batch mixer and vulcanizing rubber (A).

Examples of internal batch mixers are the so-called Banbury mixers.

Examples of mills are roller mills.

Sulphur may be applied in quantities such as 0.1 to 5 phr, preferably 0.5 to 2.5 phr.

Mixing may be performed in one or preferably more sub-steps. Vulcanizations of rubber (A) starts almost instantaneously upon mixing an inventive rubber composition with sulphur. It is preferred to first make an inventive rubber composition by mixing rubber (A) with silica (B), further ingredients (F), and optionally, polymer (D), to then add surfactant (C), and to then add sulphur (E) and, if desired, one or more sulphur compounds (E).

The inventive manufacturing process may be performed at a temperature in the range of from 30 to 160° C. Heating may be accomplished with steam or automatically by energy uptake during the mixing as such. It is preferred to cool down the mixtures obtained between the various mixing sub-steps. It is also preferred to perform mixing in various sub-steps, the first ones being at a temperature in the range of from 30 to 120° C. to avoid premature vulcanization, preferably 40 to 110° C.

In a preferred embodiment, first an inventive rubber composition is made by mixing rubber (A) with silica (B), further ingredients (F), and optionally, polymer (D), to then add surfactant (C), and to then add sulphur (E) and, if desired, one or more sulphur compounds (E), followed by extrusion at a maximum temperature of 125° C. The preproduct so obtained may then be transferred to a tire building machine.

WORKING EXAMPLES

General Remarks:

The Mooney viscosity was determined in accordance with DIN 53523-2 1991-05 in a shearing-disc viscosimeter viscTECH made by DEGUMA Schütz GmbH. The shearing-disc viscosimeter was operated with closed safety glass and replaceable tube to additionally examine the start of the vulcanization reaction.

The vulcanization time was measured in accordance with ASTM D 2084.

The coefficient of friction between the tread and the road surface is the loss factor (tan delta) of the tread rubber mixture in relationship. It was determined according to DIN 53513 at 60° C., constant deformation, deformation frequency: 10 Hz, amplitude: 0.2% at 10% first deformation.

A base mixture of the following ingredients was used:

Rubber (A.1): SBR as S-SBR

Rubber (A.2): butyl rubber, commercially available as Buna® CB 24

Silica (B.1): pyrogenic $SiO_2$, BET surface ($N_2$): 175 m$^2$/g, average secondary particle diameter: 5 to 25 μm Silane: $(C_2H_5O)_3Si—(CH_2)_3—S_4—(CH_2)_3Si(OC_2H_5)_3$ Curing agents:

N-isopropyl-N'-phenyl-para-phenylendiamine ("IPPD"), commercially available as Vulkanox® 4010 from Lanxess AG N-(1,3-dimethylbutyl)-N'-phenyl-para-phenylendiamine ("6PPD"), commercially available as Vulkanox® 4020 from Lanxess AG Polymerized 2,2,4-trimethyl-1,2-dihydroquinoline, commercially available as Vulkanox® HS/LG TMQ from Lanxess AG ("HS-TMQ")

(C.1):

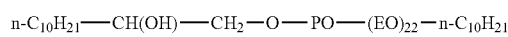

(C.2):

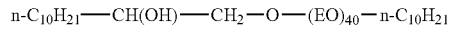

(C.3):

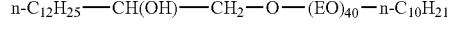

(C.4):

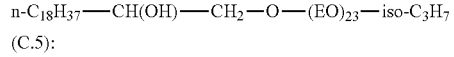

(C.5):

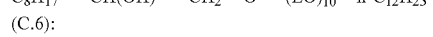

(C.6):

(C.7):

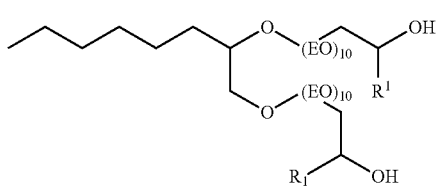

with both $R^1$ being n-$C_{10}H_{21}$
(C.15): (I.b.2) but with x=y=44.

(C.8): $R^1$—CO—NH—CH$_2$—CH$_2$—O-(EO)$_{25}$— CH$_2$—CH$_2$—NH—CO—$R^1$     (I c.1)

(C.9): $R^1$—CO—NH—CH$_2$—CH$_2$—O-(EO)$_{50}$— CH$_2$—CH$_2$—NH—CO—$R^1$     (I c.1)

For comparison purposes, the following non-ionic surfactants were tested as well:
c-(C.10): polyethyleneglycol, $M_w$ 4,000 g/mole
c-(C.11): tri-bloc copolymer of ethylenglycol-propylenglycol-ethylenglycol, average formula (EO)$_2$—(PO)$_{16}$-(EO)$_2$
c-(C.12): tri-bloc copolymer of ethylenglycol-propylenglycol-ethylenglycol, average formula (EO)$_{18}$—(PO)$_6$-(EO)$_{18}$
c-(C.13): tri-bloc copolymer of propylenglycol-ethylenglycol-propylenglycol, average formula (PO)$_{27}$-(EO)$_8$—(PO)$_{27}$ Additionally, the following anionic surfactant was tested for comparison purposes:
c-(C.14): Zn oleate
(D.1): polyethylenimine, $M_n$: 800 g/mol, viscosity according to Brookfield: 5,000 mPa·s The following general vulcanizable rubber (rubber stock) was used:
70 phr (A.1), 30 phr (A.2)
80 phr (B.1)
10 phr soot, furnace, ASTM code N 234
20 phr TDAE (treated distillate aromatic extract oil), commercially available as Vivatec® 500
1.0 phr IPPD, 2.0 phr 6PPD, 0.5 phr SH-TMQ Surfactant was added and in accordance with Table 1, and the resultant mixture was mixed on a roller mill at 40° C. over a period of time of 10 minutes. Then, the tests were performed. The test results are summarized in Table 1.

TABLE 1 inventive rubbers and comparative rubbers and their test results

| surfactant type | phr | (D.1) phr | Mooney viscosity [MU] | Vulcanization time [min] | tan delta at 60° C. |
|---|---|---|---|---|---|
| none | — | — | 109 | 23 | 0.125 |
| c-(C.14) | 2 | — | 88 | | |
| c-(C.14) | 4 | — | 79 | 20 | 0.123 |
| c-(C.10) | 2 | — | 79 | | |
| c-(C.10) | 4 | — | 63 | 21 | 0.123 |
| c-(C.11) | 2 | — | 83 | | |
| c-(C.11) | 4 | — | 72 | 21 | 0.124 |
| c-(C.12) | 2 | — | 80 | | |
| c-(C.12) | 4 | — | 69 | 22 | 0.123 |
| c-(C.13) | 2 | — | 77 | | |
| c-(C.13) | 4 | — | 64 | 22 | 0.123 |
| (C.1) | 2 | — | 61 | | |
| (C.1) | 4 | — | 53 | 18 | 0.121 |
| (C.2) | 2 | — | 56 | | |
| (C.2) | 4 | — | 44 | 18 | 0.121 |
| (C.3) | 2 | — | 59 | | |
| (C.3) | 4 | — | 48 | 19 | 0.121 |
| (C.2) | 2 | 2 | 59 | | |
| (C.2) | 4 | 2 | 49 | 11 | 0.120 |
| (C.7) | 2 | — | 60 | | |
| (C.7) | 4 | — | 51 | 19 | 0.121 |
| (C.7) | 2 | 2 | 63 | | |
| (C.7) | 4 | 2 | 52 | 12 | 0.121 |
| (C.4) | 2 | — | 69 | | |
| (C.4) | 4 | — | 58 | 21 | 0.122 |
| (C.5) | 2 | — | 70 | | |
| (C.5) | 4 | — | 58 | 21 | 0.122 |
| (C.6) | 2 | — | 69 | | |
| (C.6) | 4 | — | 59 | 20 | 0.121 |
| (C.8) | 2 | — | 66 | | |
| (C.8) | 4 | — | 65 | 19 | 0.122 |
| (C.9) | 2 | — | 64 | | |
| (C.9) | 4 | — | 56 | 19 | 0.122 |

The invention claimed is:
1. A rubber composition comprising
(A) at least one rubber selected from sulphur vulcanizable rubbery elastomers,
(B) silica selected from the group consisting of precipitated silica and fumed silica,
(C) at least one non-ionic surfactant (C) that is selected from compounds according to general formula (I a)

$R^1$—CH(OH)—CH$_2$—O-(AO)$_x$—$R^2$,     (I a)

and from compounds according to general formula (I b)

$R^1$—CH(OH)—CH$_2$—O-(AO)$_x$-$A^1$-O-(AO)$_y$— CH$_2$—CH(OH)—$R^1$,     (I b)

and from compounds according to general formula (I c)

$R^1$—CO—NH—CH$_2$—CH$_2$—O-(AO)$_x$—CH$_2$— CH$_2$—NH—CO—$R^1$,     (I c)

wherein
$R^1$ are same or different and selected from $C_4$-$C_{30}$-alkyl, straight-chain or branched, and from $C_4$-$C_{30}$-alkylene, straight-chain or branched, with at least one C—C double bond,
$R^2$ are same or different and selected from $C_1$-$C_{30}$-alkyl, straight-chain or branched, and from $C_2$-$C_{30}$-alkylene, straight-chain or branched, with at least one C—C double bond,
$A^1$ is selected from $C_2$-$C_{10}$-alkylene, straight chain or branched,
x, y same or different and selected from 10 to 50, and
AO is selected from identical or different alkylene oxides, selected from CH$_2$—CH$_2$—O, (CH$_2$)$_3$—O, (CH$_2$)$_4$—O, CH$_2$CH(CH$_3$)—O, CH(CH$_3$)—CH$_2$—O— and CH$_2$CH(n-$C_3H_7$)—O.

2. The rubber composition according to claim 1 wherein $R^1$ in compound according to general formula (I a) or (I b) is selected from n-$C_6$-$C_{16}$-alkyl.

3. The rubber composition according to claim 1 wherein $R^2$ in compound according to general formula (I a) is selected from $C_6$-$C_{18}$-alkyl.

4. The rubber composition according to claim 1 wherein x is selected from 12 to 20.

5. The rubber composition according to claim 1 wherein in compound according to general formula (I) all AO are $CH_2$—$CH_2$—O groups.

6. The rubber composition according to claim 1 additionally comprising
(D) at least one polymer selected from polyalkylenimines, polyalkoxylated or not polyalkoxylated.

7. The rubber composition according to claim 6 containing in total in the range of from 10 to 100 phr silica (B) and from 0.5 to 5 phr non-ionic surfactant (C) and from zero to 1 phr polyalkylenimine (D).

8. The rubber composition according to claim 1 for the use in the manufacture of tire parts.

9. The rubber composition according to claim 1 for use in the manufacture of tire treads.

10. A process for making a tire tread comprising mixing a silica (B) selected from the group consisting of precipitated silica and fumed silica with at least one non-ionic surfactant (C) selected from compounds according to general formula (I a)

$$R^1-CH(OH)-CH_2-O-(AO)_x-R^2, \tag{I a}$$

and from compounds according to general formula (I b)

$$R^1-CH(OH)-CH_2-O-(AO)_x-A^1-O-(AO)_y-CH_2-CH(OH)-R^1, \tag{I b}$$

and from compounds according to general formula (I c)

$$R^1-CO-NH-CH_2-CH_2-O-(AO)_x-CH_2-CH_2-NH-CO-R^1, \tag{I c}$$

wherein
$R^1$ are same or different and selected from $C_4$-$C_{30}$-alkyl, straight-chain or branched, and from $C_4$-$C_{30}$-alkylene, straight-chain or branched, with at least one C—C double bond,
$R^2$ are same or different and selected from $C_1$-$C_{30}$-alkyl, straight-chain or branched, and from $C_2$-$C_{30}$-alkylene, straight-chain or branched, with at least one C—C double bond,
$A^1$ is selected from $C_2$-$C_{10}$-alkylene, straight chain or branched,
x, y same or different and selected from 10 to 50, and
AO is selected from identical or different alkylene oxides, selected from $CH_2$—$CH_2$—O, $(CH_2)_3$—O, $(CH_2)_4$—O, $CH_2CH(CH_3)$—O, $CH(CH_3)$—$CH_2$—O— and $CH_2CH(n$-$C_3H_7)$—O—,
and sulphur or at least one sulphur compound (E) and, optionally, one or more further ingredients (F) in a kneader, mill, extruder or internal batch mixer and a vulcanizing rubber (A).

* * * * *

UNITED STATES PATENT AND TRADEMARK OFFICE
CERTIFICATE OF CORRECTION

PATENT NO.         : 10,836,208 B2
APPLICATION NO.    : 16/310894
DATED              : November 17, 2020
INVENTOR(S)        : Stephan Hueffer et al.

Page 1 of 1

It is certified that error appears in the above-identified patent and that said Letters Patent is hereby corrected as shown below:

On the Title Page

Item (57), Line 23, "R2" should be -- A1 --.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*